UNITED STATES PATENT OFFICE.

JOHN BARTH, JR., OF EVANSVILLE, ILLINOIS.

IMPROVEMENT IN INSECTICIDES.

Specification forming part of Letters Patent No. 207,235, dated August 20, 1878; application filed July 3, 1878.

*To all whom it may concern:*

Be it known that I, JOHN BARTH, Jr., of Evansville, in the county of Randolph and State of Illinois, have invented a new and Improved Compound for Destroying the Weevil; and I do hereby declare that the following is a full, clear, and exact description of the same.

My compound is composed of four ingredients—to wit, cassia, carbonate of ammonia, camphor, and bicarbonate of soda—and is efficacious in preventing weevils and other insects from infesting or destroying wheat and other grain, also garden-seeds of various kinds.

The compound is in the form of powder, and the proportion of the ingredients required for one-half ($\frac{1}{2}$) pound of the compound is as follows: Cassia, one ounce; carbonate ammonia, two ounces; gum-camphor, two ounces; bicarbonate of soda, three ounces. These substances are reduced to powder and thoroughly mixed, and the aggregate quantity (one-half pound) suffices for one hundred bushels of wheat. The powder is sprinkled on, and mixed, in any convenient way, with the dry grain in the bin or granary; but it does not adhere to the latter, and may hence be removed by passing the grain through a fanning-mill, after which no smell or odor of the powder will adhere to it. The compound is not, however, poisonous, and hence, in the small proportion used, no material harm would follow its incorporation and consumption with the flour made from the wheat or other grain.

If the compound is used on grain in the straw, the bundles of the latter are laid about two feet in depth, and the powder is then sprinkled over them to the amount of one pound for an estimated quantity of one hundred bushels of wheat. Another layer of the bundles is then laid, and the powder sprinkled as before, and so on.

The compound will afford the desired protection for about one and a half to two years.

The first three ingredients—to wit, cassia, carbonate of ammonia, and camphor—are the protective elements of the compound, while the last—to wit, soda—is chiefly useful in pre-preventing the others from adhering to the grain or seeds, which must obviously be in a dry condition.

The use of the compound will effectually prevent the destruction or damage of grain or seeds by the weevil and various other insects, also grubs, &c., and is hence of great economical value.

What I claim is—

The compound for the purpose specified, composed of cassia, carbonate of ammonia, camphor, and bicarbonate of soda, in about the proportions stated.

JOHN BARTH, JR.

Witnesses:
SAML. T. CROZIER,
BOLTON DYER.